(12) United States Patent
Theobald

(10) Patent No.: US 11,180,086 B2
(45) Date of Patent: Nov. 23, 2021

(54) ROOFTOP STORAGE COMPARTMENT

(71) Applicant: Toni Theobald, Littleton, CO (US)

(72) Inventor: Toni Theobald, Littleton, CO (US)

( * ) Notice: Subject to any disclaimer, the term of this patent is extended or adjusted under 35 U.S.C. 154(b) by 72 days.

(21) Appl. No.: 16/689,573

(22) Filed: Nov. 20, 2019

(65) Prior Publication Data

US 2021/0146762 A1 May 20, 2021

(51) Int. Cl.
*B60R 9/04* (2006.01)
*B60J 7/20* (2006.01)
*B60R 11/00* (2006.01)

(52) U.S. Cl.
CPC ............ *B60R 9/04* (2013.01); *B60J 7/20* (2013.01); *B60R 11/00* (2013.01); *B60R 2011/0028* (2013.01)

(58) Field of Classification Search
CPC .................................................. B60R 9/04
USPC ................. 296/37.7; 224/309, 328, 315
See application file for complete search history.

(56) References Cited

U.S. PATENT DOCUMENTS

| | | | | |
|---|---|---|---|---|
| 1,762,640 A * | 6/1930 | Sanford | ............... | B62D 47/02 296/178 |
| 2,963,314 A * | 12/1960 | Richardson | ............ | B60R 9/055 296/37.7 |
| 3,715,044 A * | 2/1973 | Simons | ................. | B60P 3/38 414/462 |
| 4,317,534 A * | 3/1982 | Louw | ................... | B60R 9/055 224/316 |
| 4,650,238 A * | 3/1987 | Healey | .................. | B60R 9/08 224/274 |
| 7,699,372 B2 * | 4/2010 | Adams | .................. | B60R 9/055 296/26.07 |
| 2005/0194414 A1* | 9/2005 | Lynch | ................... | B60R 9/055 224/401 |
| 2014/0132022 A1* | 5/2014 | Espig | ................... | B60R 9/055 296/37.7 |
| 2018/0298639 A1* | 10/2018 | Rais | ................... | E05B 47/0001 |
| 2020/0039443 A1* | 2/2020 | Yang | ..................... | B29C 41/04 |
| 2021/0040789 A1* | 2/2021 | Rozbicki | ............... | H02J 50/20 |

* cited by examiner

*Primary Examiner* — Dennis H Pedder
(74) *Attorney, Agent, or Firm* — The Iwashko Law Firm, PLLC; Lev Ivan Gabriel Iwashko

(57) ABSTRACT

A rooftop storage compartment disposed on a roof of a vehicle, including a main body to store at least one item therein, a plurality of doors pivotally disposed on at least a portion of the main body to move from closed in a first position to at least partially opened in a second position, and a locking mechanism disposed within each of the plurality of doors to prevent each of the plurality of doors from opening in response to locking the locking mechanism.

9 Claims, 2 Drawing Sheets

ROOFTOP STORAGE COMPARTMENT

BACKGROUND

1. Field

The present general inventive concept relates generally to a storage unit with compartments, and particularly, to a rooftop storage unit with compartments.

2. Description of the Related Art

Traditional golf carts and similar recreational and utility vehicles often do not have adequate space for storing belongings. Storage options for a golf cart are usually limited to a glove box, an empty seat, and/or a passenger's lap.

Also, any person using these vehicles may have to leave them unattended. For example, some communities use golf carts for local travel. As such, a user of these vehicles will have to take their belongings with them even if making just a quick stop because there is currently no lockable storage compartment other than the glove box.

Therefore, there is a need for additional storage compartments on a golf cart including an ability to lock to prevent theft.

SUMMARY

The present general inventive concept provides a rooftop storage compartment.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing rooftop storage compartments as part of a roof of a vehicle, including a main body with multiple compartments to store at least one item therein, a plurality of doors pivotally disposed on at least a portion of the main body to move from closed in a first position to at least partially opened in a second position, and a locking mechanism disposed within each of the plurality of doors to prevent each of the plurality of doors from opening in response to locking the locking mechanism.

The plurality of doors may be constructed from at least one of metal, plastic, wood, rubber, and electrochromic glass.

The rooftop storage compartment may further include an electric generator disposed within at least a portion of the main body and connected to the plurality of doors to generate a current of electricity.

The rooftop storage compartment may further include a generator switch disposed on at least a portion of the main body to turn on the electric generator in a first switch position, and turn off the electric generator in a second switch position.

At least one of the plurality of doors may turn transparent in response to turning on the electric generator, and may turn opaque in response to turning off the electric generator.

The main body may be eighty inches in length and forty-three inches in width.

Each of the plurality of doors may move independently with respect to each other.

Each of the plurality of doors may move by sliding within the main body or opening on hinges top, bottom, or side.

The rooftop storage compartment may further include a power source disposed within at least a portion of the main body to connect to a mobile device, such that the power source charges the mobile device.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Rooftop Storage Compartment 100
Main Body 110
First Side 111
Second Side 112
Third Side 113
Fourth Side 114
Fifth Side 115
Sixth Side 116
Plurality of Doors 120
Locking Mechanism 130
Electric Generator 140
Generator Switch 150
Power Source 160

Figure 1:
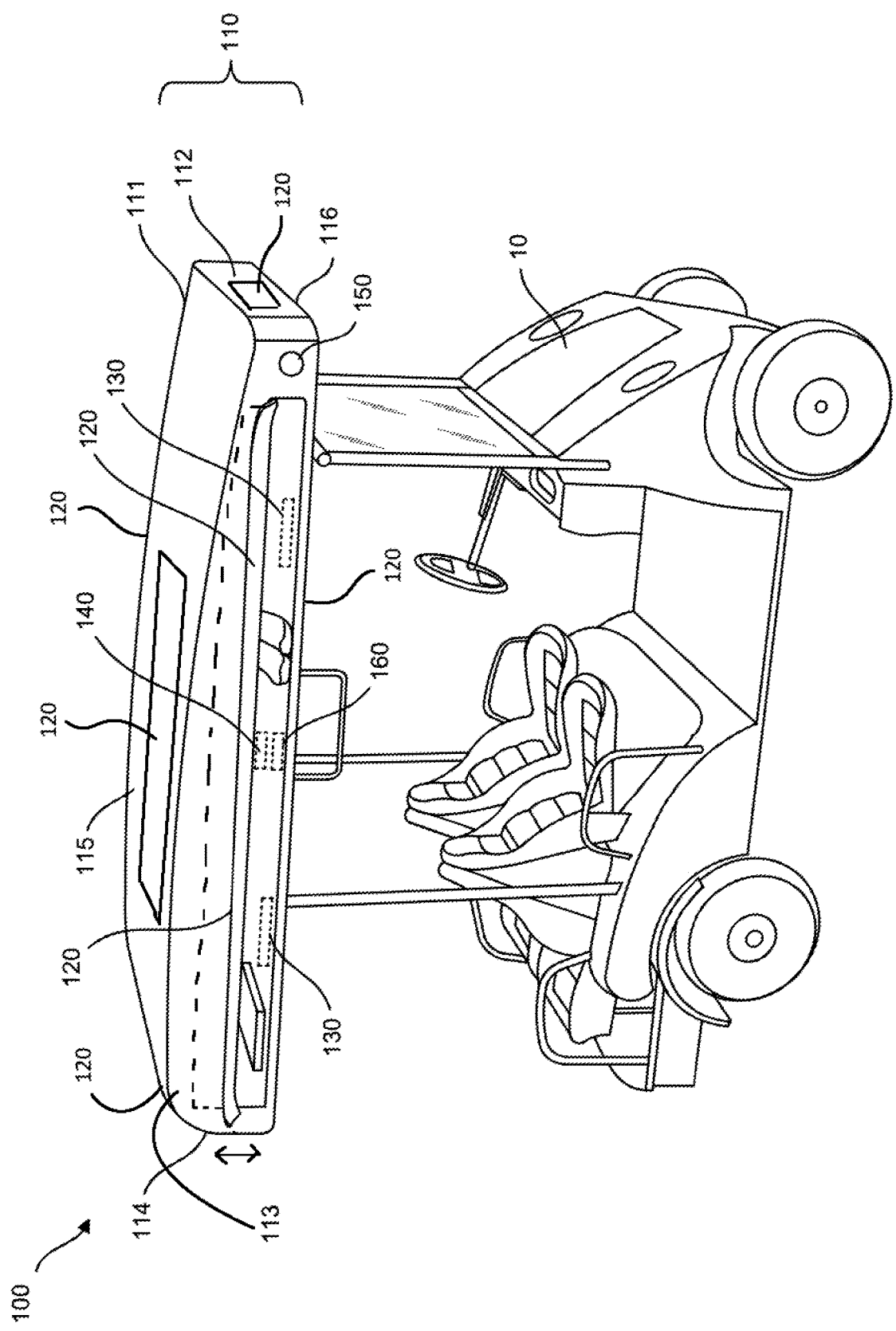
FIG. 1 illustrates a side perspective view of a rooftop storage compartment disposed on a golf cart, according to an exemplary embodiment of the present general inventive concept.

FIG. 1 illustrates a side perspective view of a rooftop storage compartment 100 disposed on a golf cart 10, according to an exemplary embodiment of the present general inventive concept.

Figure 2:
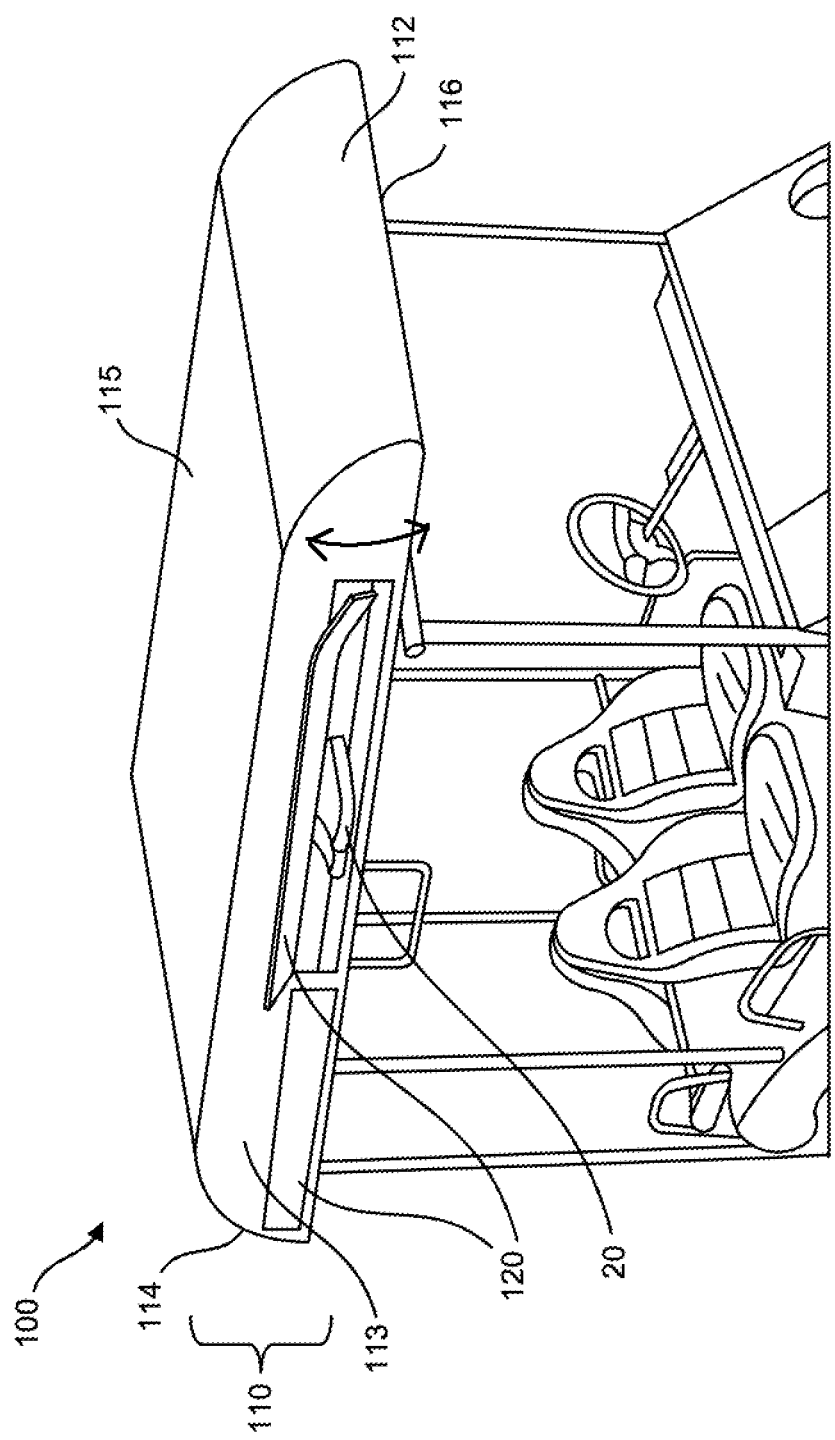
FIG. 2 illustrates a front perspective view of the rooftop storage compartment disposed on the golf cart, according to an exemplary embodiment of the present general inventive concept.

FIG. 2 illustrates a front perspective view of the rooftop storage compartment 100 disposed on the golf cart 10, according to an exemplary embodiment of the present general inventive concept.

The rooftop storage compartment 100 may be constructed from at least one of metal, plastic, wood, glass, and rubber, etc., but is not limited thereto, and may include foam or any type of insulating material. Furthermore, the rooftop storage compartment 100 may be insulated to keep contents therein at a substantially constant temperature. For example, the insulation may prevent fluctuations in temperature, such that the temperature may remain warm or cool, and unaffected by an external temperature gradient (i.e. a difference of at least five degrees Fahrenheit).

The rooftop storage compartment 100 may include a main body 110, a plurality of doors 120, a locking mechanism 130, an electric generator 140, a generator switch 150, and a power source 160, but is not limited thereto.

The main body 110 may be disposed on at least a portion of a top of the golf cart 10. In other words, the main body 110 may be a roof of the golf cart 10, or alternatively, may be placed atop of the golf cart 10. As such, the main body 110 may replace the rood of the golf cart 10, such that the rooftop storage compartment 100 is a part of the golf cart 10.

The main body 110 may be of any predetermined size. For example, the main body 110 may be eighty inches in length and forty-three inches in width. The golf cart 10 may be a golf cart or any other vehicle known to one of ordinary skill in the art.

Referring to FIGS. 1 and 2, the main body 110 may include a first side 111, a second side 112, a third side 113, a fourth side 114, a fifth side 115, and a sixth side 116, but is not limited thereto.

The main body 110 is illustrated to have a rectangular prism shape. However, the main body 110 may be rectangular, cylindrical, circular, pentagonal, hexagonal, octagonal, or any other shape known to one of ordinary skill in the art, but is not limited thereto.

Referring to FIG. 1, alternatively, the second side 112 of the main body 110 may be beveled on at least a portion thereof.

The main body 110 may store at least one item 20 therein.

The first side 111, the second side 112, the third side 113, the fourth side 114, the fifth side 115, and the sixth side 116 may include walls that surround an interior cavity of the main body 110. Additionally, the second side 112 may include a front side of the main body 110 corresponding to a front of the golf cart 10. Also, the fourth side 114 may include a rear side of the main body 110 corresponding to a rear of the golf cart 10.

The fifth side 115 may include a top surface of the main body 110. The sixth side 116 may include a bottom surface of the main body 110.

The plurality of doors 120 may be constructed from at least one of metal, plastic, wood, rubber, and electrochromic glass and/or smart glass.

Referring again to FIGS. 1 and 2, the plurality of doors 120 are illustrated to be disposed on at least a portion of the first side 111 and at least a portion of the third side 113. However, at least one of the plurality of doors 120 may be disposed on at least one of the first side 111, the second side 112, the third side 113, the fourth side 114, the fifth side 115, and the sixth side 116.

Moreover, the plurality of doors 120 may have different configurations. For example, each of the plurality of doors 120 may be a single door spanning a length of the first side 111 and/or a length of the third side 113, respectively. In other words, each of the plurality of doors 120 may be a long door on at least a portion of the first side 111 and/or at least a portion of the third side 113, respectively. Alternatively, the plurality of doors 120 may include at least two doors on the first side 111 and/or the third side 113.

Referring to FIG. 2, each of the plurality of doors 120 may be pivotally disposed on at least a portion of the first side 111 and/or at least a portion of the third side 113 via a hinge. Alternatively, each of the plurality of doors 120 may be slidably disposed to move from closed in a first position to at least partially opened in a second position, such each of the plurality of doors 120 may move within at least a portion of the main body 110.

Furthermore, the at least one item 20 may be inserted within an interior of the main body 110 in response to opening at least one of the plurality of doors 120.

The locking mechanism 130 may include a combination lock, a padlock, a key operated latch, and a touchpad, but is not limited thereto.

The locking mechanism 130 may be disposed within at least a portion of each of the plurality of doors 120. The locking mechanism 130 may be manipulated to lock each of the plurality of doors 120. As such, the locking mechanism 130 may prevent each of the plurality of doors 120 from opening in response to locking the locking mechanism 130.

The electric generator 140 may be disposed within at least a portion of the main body 110. Additionally, the electric generator 140 may be connected to the plurality of doors 120 to generate and send a current of electricity to the plurality of doors 120.

Each of the plurality of doors 120 may turn transparent in response to receiving the current of electricity from the electric generator 140. Alternatively, each of the plurality of doors 120 may turn opaque in response to preventing the current of electricity from being sent from the electric generator 140.

The generator switch 150 may include a switch, a lever, a button, a dial, and a biometric reader, but is not limited thereto.

The electric generator 140 may activate in response to moving the generator switch 150 to a first switch position, and deactivate in response to moving the generator switch 150 to a second switch position. In other words, the generator switch 150 may turn on and/or turn off the electric generator 140. As such, the plurality of doors 120 may be transparent in response to turning on the electric generator 140, and opaque in response to turning off the electric generator 140.

The power source 160 may include a power cord, a battery, a solar cell, but is not limited thereto. Additionally, the battery may include lithium-ion, nickel cadmium, nickel metal hydride, alkaline, etc., but is not limited thereto.

The power source 160 may be disposed within at least a portion of the main body 110 to send power to at least one of the locking mechanism 130, the electric generator 140, and the generator switch 150.

Furthermore, the power source 160 may be connected to a mobile device (i.e. a cell phone, a laptop, a tablet) to charge the mobile device.

Therefore, the rooftop storage compartment 100 may provide additional storage space for the golf cart 10, such that a user may refrain from using luggage. Furthermore, the rooftop storage compartment 100 may prevent theft of the at least one item 20 stored within the main body 110. As such, the user may leave the at least one item 20 within the main body 110 without another user remaining on the golf cart 10.

The present general inventive concept may include a rooftop storage compartment 100 disposed on a roof of a vehicle 10, including a main body 110 to store at least one item 20 therein, a plurality of doors 120 pivotally disposed on at least a portion of the main body 110 to move from closed in a first position to at least partially opened in a second position, and a locking mechanism 130 disposed within each of the plurality of doors 120 to prevent each of the plurality of doors 120 from opening in response to locking the locking mechanism 130.

The plurality of doors 120 may be constructed from at least one of metal, plastic, wood, rubber, and electrochromic glass.

The rooftop storage compartment 100 may further include an electric generator 140 disposed within at least a portion of the main body 110 and connected to the plurality of doors 120 to generate a current of electricity.

The rooftop storage compartment 100 may further include a generator switch 150 disposed on at least a portion of the main body 110 to turn on the electric generator 140 in a first switch position, and turn off the electric generator 140 in a second switch position.

At least one of the plurality of doors 120 may turn transparent in response to turning on the electric generator 140, and may turn opaque in response to turning off the electric generator 140.

The main body 110 may be eighty inches in length and forty-three inches in width or any size that works as a storage unit for this type of vehicle.

Each of the plurality of doors 120 may move independently with respect to each other.

Each of the plurality of doors 120 may move by sliding within the main body or on hinges.

The rooftop storage compartment 100 may further include a power source 160 disposed within at least a portion of the main body 110 to connect to a mobile device, such that the power source charges the mobile device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A rooftop storage compartment disposed on a roof of a vehicle, the rooftop storage compartment comprising:
   a main body to store at least one item therein, the main body comprising a first side, a second side, a third side, a fourth side, a fifth side, and a sixth side;
   a plurality of doors pivotally disposed on at least a portion of the first side, the second side, the third side, the fourth side, the fifth side, and the sixth side of the main body to move from closed in a first position to at least partially opened in a second position; and
   a locking mechanism disposed within each of the plurality of doors to prevent each of the plurality of doors from opening in response to locking the locking mechanism.

2. The rooftop storage compartment of claim 1, wherein the plurality of doors are constructed from at least one of metal, plastic, wood, rubber, and electrochromic glass.

3. The rooftop storage compartment of claim 2, further comprising:
   an electric generator disposed within at least a portion of the main body and connected to the plurality of doors to generate a current of electricity.

4. The rooftop storage compartment of claim 3, further comprising:
   a generator switch disposed on at least a portion of the main body to turn on the electric generator in a first switch position, and turn off the electric generator in a second switch position.

5. The rooftop storage compartment of claim 4, wherein at least one of the plurality of doors turns transparent in response to turning on the electric generator, and turns opaque in response to turning off the electric generator.

6. The rooftop storage compartment of claim 1, wherein the main body is eighty inches in length and forty-three inches in width.

7. The rooftop storage compartment of claim 1, wherein each of the plurality of doors move independently with respect to each other.

8. The rooftop storage compartment of claim 1, wherein each of the plurality of doors moves by sliding within the main body.

9. The rooftop storage compartment of claim 1, further comprising:
   a power source disposed within at least a portion of the main body to connect to a mobile device, such that the power source charges the mobile device.

* * * * *